United States Patent [19]
Wissman, Jr. et al.

[11] Patent Number: 4,945,754
[45] Date of Patent: Aug. 7, 1990

[54] TEST WATER METER WITH DIGITAL DISPLAY

[75] Inventors: Edward E. Wissman, Jr., Millersville; Leonard M. Guralnick, Columbia; Michael A. Perini, Forestville, all of Md.

[73] Assignee: Washington Suburban Sanitary Commission, Hyattsville, Md.

[21] Appl. No.: 382,146

[22] Filed: Jul. 18, 1989

[51] Int. Cl.$^5$ .............................................. G01F 25/00
[52] U.S. Cl. ........................................................ 73/3
[58] Field of Search ............................................. 73/3

[56] References Cited

U.S. PATENT DOCUMENTS

| | | | |
|---|---|---|---|
| 3,125,879 | 3/1964 | Porter, Jr. ................................. | 73/3 |
| 4,253,156 | 2/1981 | Lisle et al. ................................ | 73/3 |
| 4,566,307 | 1/1986 | Boykin ..................................... | 73/3 |
| 4,821,557 | 4/1989 | Beeson, III ............................... | 73/3 |
| 4,831,866 | 5/1989 | Forkert et al. ........................... | 73/3 |

FOREIGN PATENT DOCUMENTS

| | | | |
|---|---|---|---|
| 1805605 | 5/1970 | Fed. Rep. of Germany ............ | 73/3 |
| 0101521 | 8/1981 | Japan ......................................... | 73/3 |
| 0543285 | 10/1979 | U.S.S.R. ................................... | 73/3 |
| 1315818 | 6/1987 | U.S.S.R. ................................... | 73/3 |

OTHER PUBLICATIONS

Ford Meter Box Co., Brochure, pp. 48–63, Oct. 1946.

Primary Examiner—Robert Raevis
Attorney, Agent, or Firm—Millen, White & Zelano

[57] ABSTRACT

A test water meter including a digital display is portable, as well as battery-operated. The digital display includes a gallon-per-minute display and a total gallon display, each of which is resettable at any time, as well as an additional total gallon display which has a reset enabled through a security switch so that only selected personnel can reset the additional total gallon display. The test water meter includes a pair of outlet valves, one controlling a standard 4-inch outlet and the other controlling a standard ¾-inch outlet. Just upstream of each valve a meter is positioned. Associated with each meter is a transmitter for transmitting data indicative of flow rates and volumes to the digital display. Associated with the large meter is an indicator plate generally indicating flow rates as a function of valve position, the valve position being indicated by a pointer fixed to the valve spindle.

6 Claims, 5 Drawing Sheets

TEST WATER METER WITH DIGITAL DISPLAY

BACKGROUND OF THE INVENTION

The present invention relates to apparatus for testing water meters. More particularly, the instant invention relates to apparatus for testing water meters in the field and in the shop wherein the apparatus utilizes digital readouts.

Water meters are used by water utility companies to measure the amount of water consumed by customers and are the means by which a utility generates revenue to cover its expenses. Unfortunately, considerable income is lost each year due to inaccurate water meters. Thus, water meter preventive maintenance programs are of considerable value. While the primary purpose of such programs is to enable a water utility to realize maximum income from its commercial and industrial meters, there are many other benefits, including lower operating costs, reduced expenditures for new facilities, equitable distribution of cost to produce clean water, and conservation of water resources.

By maintaining meters at peak efficiency, a water utility encourages its customers to conserve water and to eliminate leaks. Over the years, many meters become inaccurate and almost always register less water than is actually consumed. When a neglected meter is finally repaired, there is often a dramatic increase in a customer's water bill, which frequently causes a customer to take the steps necessary to maintain his or her water consumption at a minimum.

Encouraging conservation of water offsets the impact of growing populations by reducing the rate at which water is consumed, in turn minimizing expenditures for increased system capacity. Moreover, encouraging conservation immediately reduces normal operating costs by reducing expenditures for treatment chemicals, power consumption, and maintenance of pumps and treatment plants, as well as avoiding the need for larger systems.

Considering a specific example, assume a water rate of $0.50/1000 gallons. A commercial customer, such as a fast food restaurant or laundromat, might have a water bill of $2,000 per quarter or $8,000 per year. The registered utilization of water of 16,000,000 gallons per year results in an $8,000 annual water bill. If the meter registers only 80 percent of the actual water used, the bill would only be $10,000 per year, and the service has lost $2,000 on a meter that was registering only 80 percent of the actual water use. Ten such accounts would add up to $20,000 per year; and, with a 100 percent sewer charge, the loss doubles to $40,000 per year. The magnitude of this problem is apparent when one considers that many meters are operating at accuracy levels of 40-60 percent.

In order to operate an effective meter maintenance program, the utility must know when a meter is malfunctioning. At present, the only way to determine system failure is with a test water meter. The current practice is to utilize a mechanical test meter in conjunction with a stopwatch. This approach requires skilled, experienced personnel, yet the accuracy of the test is still suspect. The test requires considerable time to complete, and there is no assurance that the field personnel responsible for conducting the test have actually performed it.

The industry has realized that mechanical test meters are not only likely to be inherently inaccurate, but also have the aforementioned drawbacks. Accordingly, at least one company claims to have developed an electronic mobile meter. This meter is very expensive and is not readily separable from the vehicle which transports it. To date, the instant inventors are unaware of any commercialization of this mobile meter.

For the foregoing reasons, there is a need for a simple, accurate test meter which can be successfully operated by personnel with minimal skills and experience so as to facilitate meter maintenance and achieve the advantages which flow therefrom.

SUMMARY OF THE INVENTION

It is an object of the instant invention to provide new and improved apparatus for testing water meters.

Upon further study of the specification and appended claims, further objects and advantages of this invention will become apparent to those skilled in the art.

In view of the aforementioned object and other objects, the instant invention is directed to a test water meter for field and shop testing water meters, wherein the test water meter comprises an inlet pipe and first and second outlet pipes with a large volume meter disposed between the inlet pipe and first outlet pipe and a small volume water meter disposed between the inlet pipe and second outlet pipe. A first valve is disposed downstream of the large meter, and a second valve is disposed downstream of the small volume meter. An analog gauge, positioned proximate the operating handle of the first valve, indicates an approximate flow rate as a function of valve stem position when the first valve is opened. A first set of digital readouts is connected to the large volume meter, and a second set of digital readouts is connected to the small volume meter to digitally display flow parameters through whichever meter is monitoring the flow. The meter monitoring the flow is selected by opening the first or second valve so that the respective digital readouts, which are indicative of the actual flow of the meter, can be compared to readings of the meter under test located upstream of the test water meter.

Digital readouts of the water test meter displays both gallons per minute and total gallons, the latter of which may be immediately reset.

In addition to displaying gallons per minute and total gallons, there is a further total gallon display which is connected to a reset circuit, the reset circuit being enabled only upon operating a secured switch which is secured by a key which remains in the possession of personnel other than those conducting the test.

In the disclosed embodiment of the invention, there is a first set of digital displays connected to the large volume meter and a second set of digital displays connected to the small volume water meter. Preferably, a rechargeable 12-volt battery is removably mounted with the test water meter on a base. The base mounting the test water meter includes handles for hand-carrying the meter, while a lifting eye is provided on the test water meter for hoisting the meter with a standard mechanical hoist if desired.

DESCRIPTION OF THE PREFERRED EMBODIMENT

Figure 1:
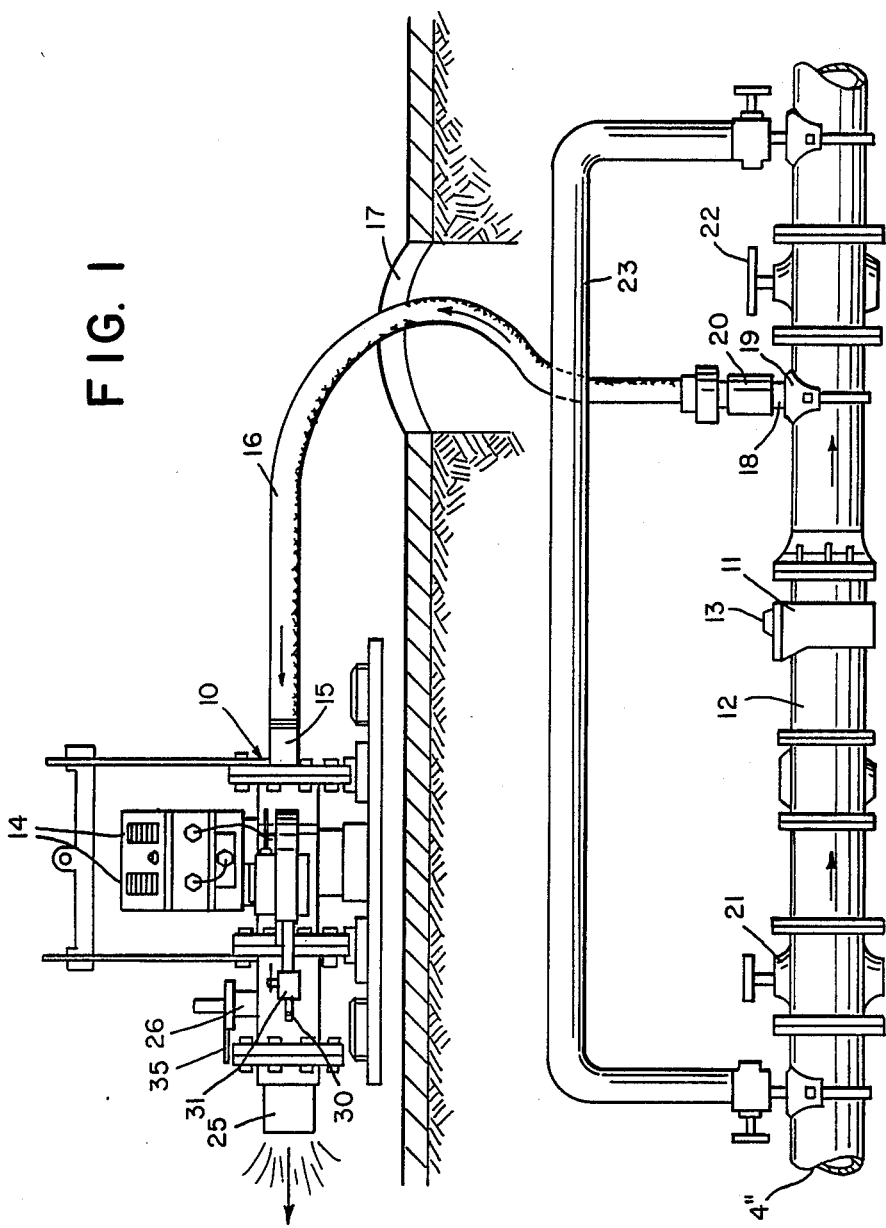
FIG. 1 is a side view showing how a test water meter such as that of the instant invention is connected in series with a meter in the field.

Referring now to FIG. 1, there is shown a digital water meter tester, designated generally by the numeral 10, configured in accordance with the principles of the instant invention and being used to test a water meter in a water line 12. In conducting the test, the amount of water recorded on the dial 13 of the meter 11 is compared to the amount of water displayed on a digital readout, designated generally by the numeral 14, on the highly accurate, calibrated digital test meter 10. If there is a discrepancy in the flow recorded by the meter 11, then the meter 11 is repaired in accordance with standard procedures which may include replacing or adjusting the gearing in the meter or perhaps pulling the meter and taking it back to the utility meter shop for extensive repair. Usually, the truck carrying the digital test meter 10 also carries replacement parts for the meter so if the meter needs to be repaired, it can be repaired immediately.

Digital test meter 10 is connected via inlet 15 to the line 12 by a length of reinforced fire hose 16 (which is inserted through a manhole 17 if the meter is underground) and connected to nipple 18 of a standard service saddle 19 by a fire hose adapter 20. Prior to effecting the connection of the fire hose 16, the valve 21 in water line 12 is closed, as is valve 22 downstream of the meter 11. If desired, the bypass line 23 can be opened so that the customer will receive water while the test is underway.

The test is initiated by closing the downstream valve 22 and opening upstream valve 21 so that water flows through the fire hose 16 and to the test meter 10. The test meter 10 has a first outlet 25 connected by a large capacity valve 26 to the meter for testing large capacity meters 11, such as those of 2- to 12-inch meters, and a second outlet 30 connected to the test meter 10 by a valve 31 for testing low flow rates on meter 11. When testing low flow rates, the same procedure is utilized as when testing 2- to 12-inch meters.

In conducting the test, either the large valve 26 is opened or the small valve 31 is opened. After several seconds, generally no more than 10 seconds, the flow out of outlet 25 or outlet 30 is stabilized, as indicated by the gallon per minute indicator, and the meter 11 is read. After a selected length of time, the valve 26 or 31 is shut to stop the flow through the meter 11 being tested and the flow through the digital test water meter 10. The change in the readout 13 of meter 11 is then compared to the amount of water which has flowed through the test meter 10 in order to determine if meter 11 is accurately monitoring flow through the pipe 12. Generally, if the meter 11 does not reflect an accurate measurement on its dial 13, the measurement is too low. It is unusual, if not unheard of, for the dial 13 to display a higher reading than the actual amount of water flowing in the pipe 12.

Figure 3:
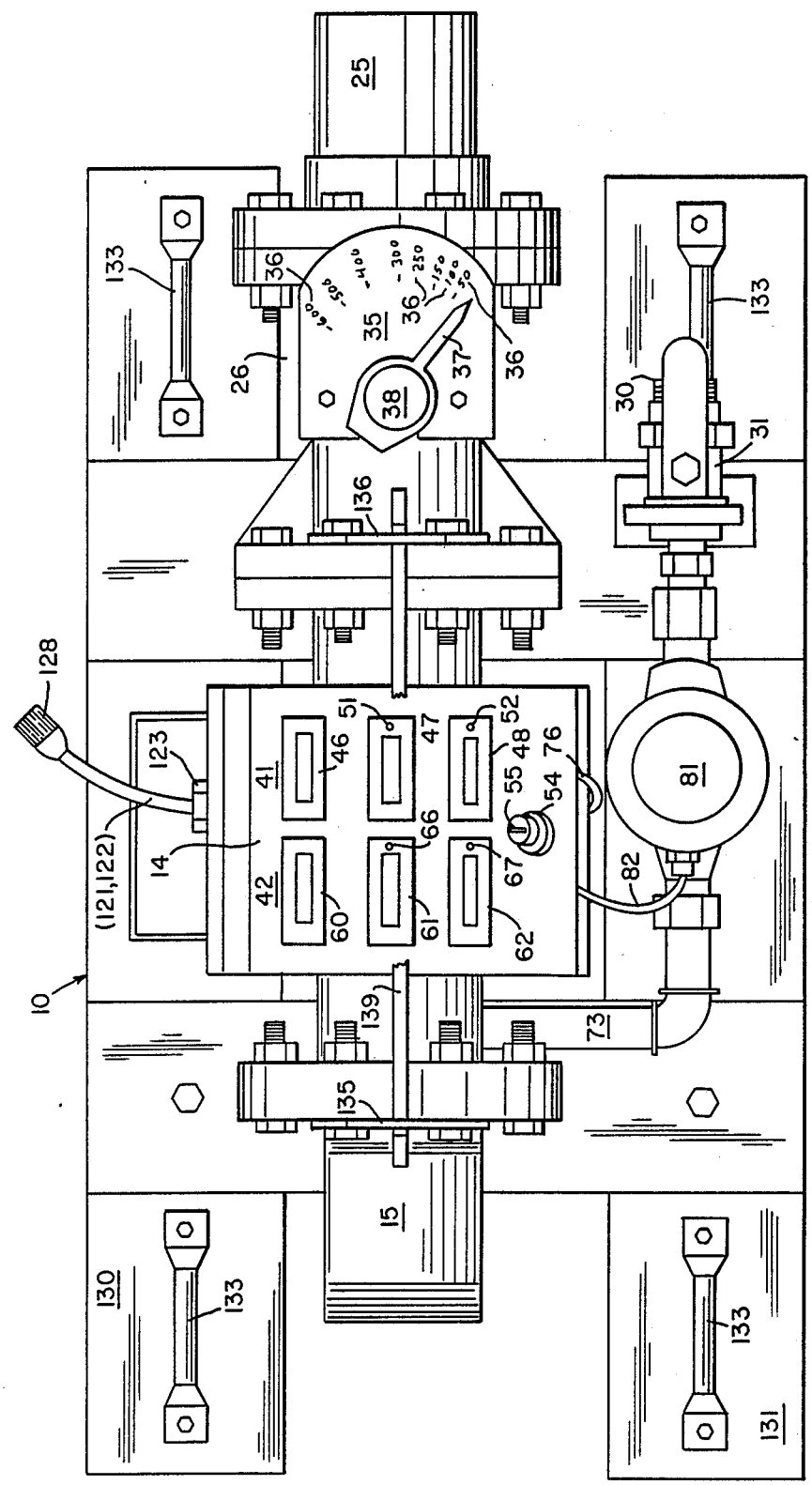
FIG. 3 is a top view of the test water meter of FIG. 2.

When testing a large meter 11 in a 2- to 12-inch line 12, the flow is quite substantial, and the meter may be accurate at one level of flow and inaccurate at another. Accordingly, as is best seen in FIG. 3, the valve 26 is equipped with an analog gauge 35. The analog gauge 35 is marked with general flow rates 36, which are aligned with the arcuate path of a pointer 37 which is fixed to the operating stem 38 of the valve 26. In the illustrated embodiment, the array of flow rates 36 range from 50 to 600 gallons per minute. The analog gauge 35 merely provides a ballpark indicator of flow rates and indicates to the operator the approximate rotary position of the valve stem 38.

Figure 2:
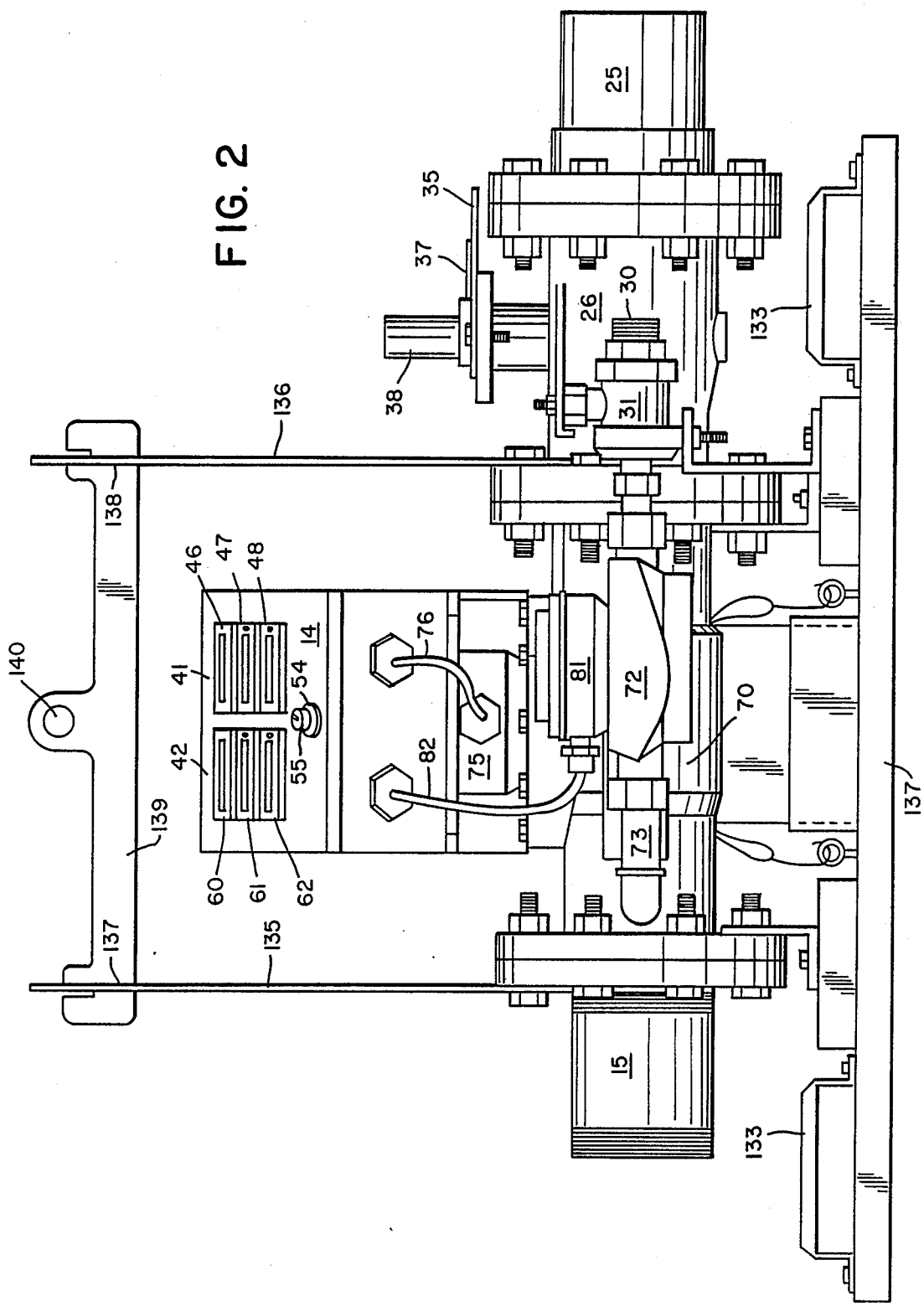
FIG. 2 is a front view of the test water meter configured in accordance with the instant invention.
Figure 4:
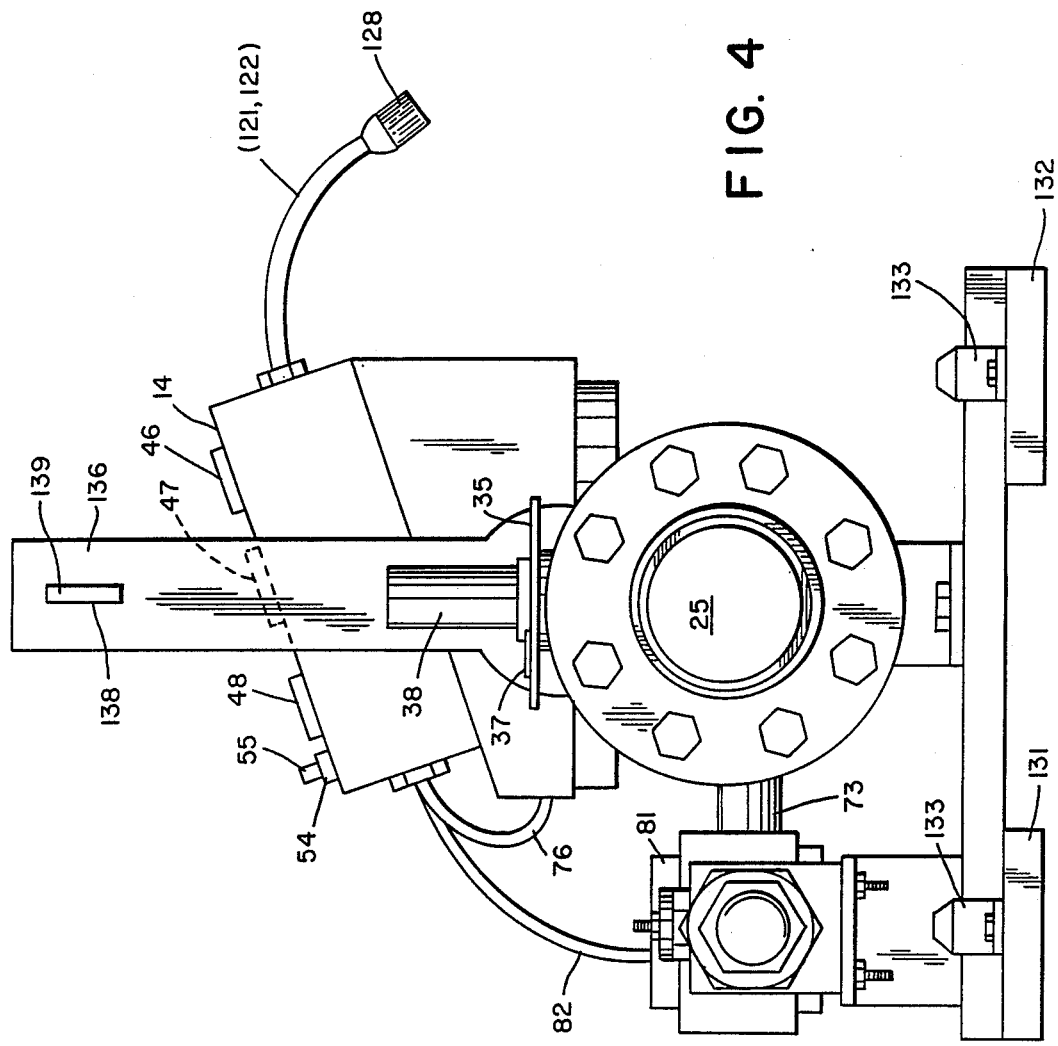
FIG. 4 is an end view of the test water meter of FIG. 2.

Referring now more specifically FIGS. 2-4, where the panel 14 is shown in greater detail, it is seen that there are first and second sets of digital indicators 41 and 42 for the 4-inch line 15 and ¾-inch line 73, respectively. The first set of digital indicators includes a gallon per minute digital indicator 46, a total gallon digital indicator 47, and a running total indicator 48. With the total gallon digital indicators, there is an instant reset button 51, whereas with the running total indicator, there is a reset button 52 which is only enabled by operating a reset security switch 54 that is secured by a key lock 55. The key to the key lock 55 is retained by management personnel so that management will have some indication as to whether or not tests have actually been conducted and thus avoid situations where technicians, for one reason or another, may simply pretend to conduct a test. The meter for the ¾-inch line 73 is monitored by a similar array of digital instrumentation, including a gallon per minute digital indicator 60, a total gallon digital indicator 61, and a running total digital indicator 62, with the total gallon digital indicator 61 being reset by instant reset button 66, while the running total digital display is reset by secured reset button 67 that is enabled by the reset security switch 54.

When testing a large meter 11, the valve stem 38 is positioned with pointer 36 aligned with a selected flow rate so as to open valve 26. The accurate flow rate is then determined and recorded from the gallon per minute digital readout 46. The total gallons measured during the test is registered by the digital readout 47, and this value can be compared to the change in gallons detected by the meter 11 and displayed by indicator 13. The stem 38 of the valve 26 can then adjusted to a new flow rate and the procedure repeated for the new flow rate in order to check the accuracy of the meter 11 throughout its range of flow rates.

As is best seen in FIG. 2, the inlet pipe 15 is connected to the valve 26 through a first flow meter 70, while the small valve 31 is connected to the inlet pipe through a second flow meter 72 by ¾-inch line 73. Flow rate meters 70 and 72 are highly accurate meters having digital outputs. An example of a preferable meter used as the first flow rate meter 70 is the 4-inch turbine meter sold by Badger Meter, Inc. of Milwaukee, Wis., dimensioned for a 4-inch line, known as the "Model Industrial Turbo" and described in the Badger Meter, Inc. Technical Brief ITB-051-01. This flow meter is equipped with a digital signal transmitter 75 that is connected by a cable 76 to the circuitry of the display panel 14. The preferable transmitter 75 is a transmitter such as transmitter PFT-1H, sold by Badger Meter, Inc. of Milwaukee, Wis.

The second meter 72, which is connected in the ¾-inch line, is preferably a positive displacement, nutating disc meter sold by Badger Meter, Inc. of Milwaukee, Wis. The second meter 72 is equipped with a transmitter 81 which is substantially identical to the transmitter 75 used with the first meter 70, but adjusted to transmit data from the smaller flow. The transmitter 81 is connected by line 82 to digital display 14.

The transmitters 75 and 81 have rotary switches that are used for scaling (multiplying) the pulse train from the meters by a factor of 0.0001 to 0.9999, which allows the test meters to be ca to high accuracy. Test meters are checked and calibrated against special calibrated tanks with certified volumes. The rotary switches within the transmitters allow for easy adjustment. Accuracy for other meter types must be corrected by disassembly and replacing parts. Accordingly, it is no longer necessary to take the meter apart and manually change the gearing if inaccuracies occur.

Figure 5:
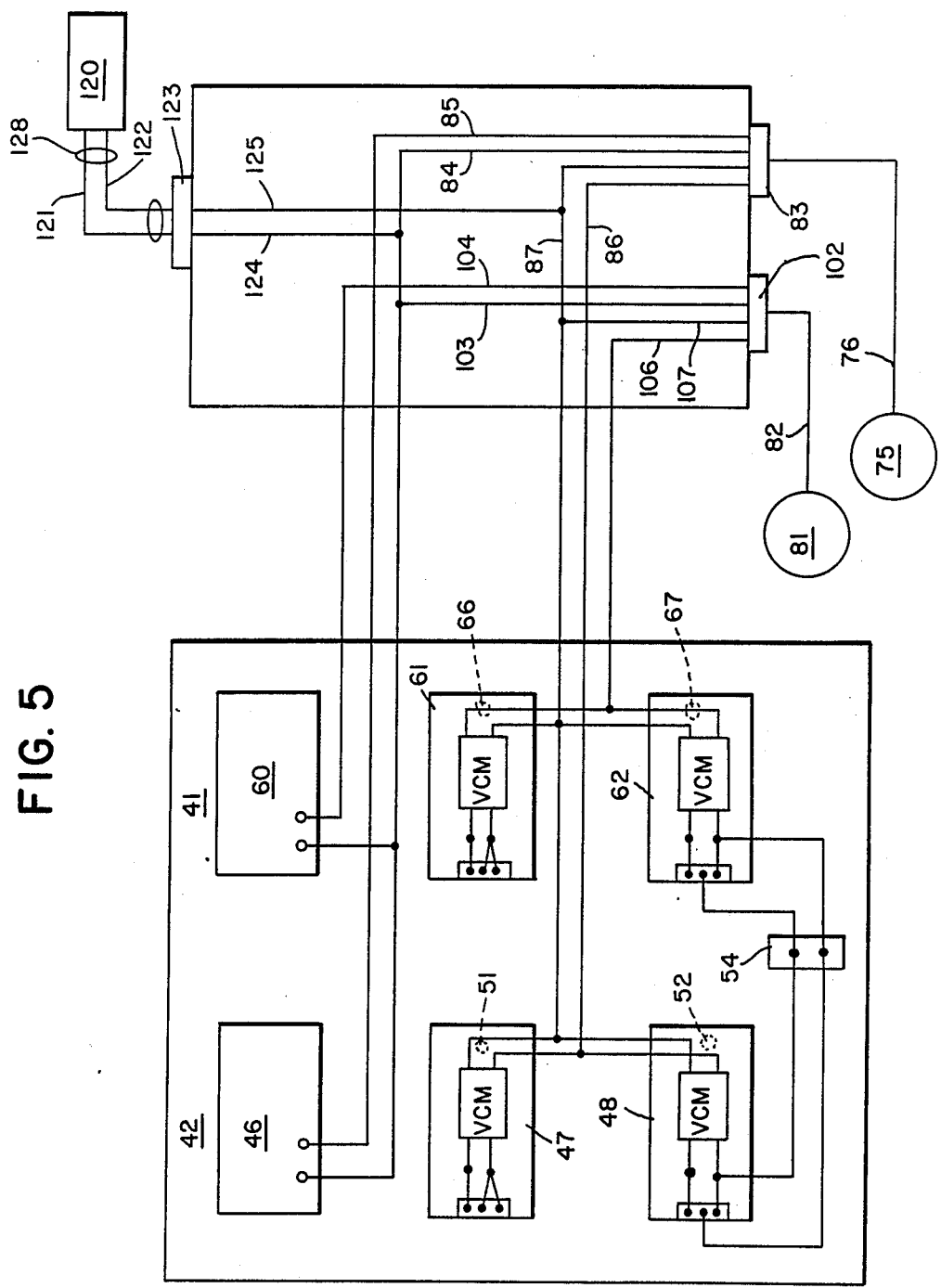
FIG. 5 is a circuit diagram illustrating how the electrical components of the test water meter are connected.

Referring now more specifically to FIG. 5, the transmitter 75 is connected by the line 76 to an electrical connector 83, identified by Model No. CGB 193, which has first output line 85 carrying flow rate signals and second output line 86, which carries cumulative signals totalizing the number of gallons. Lines 84 and 87 carry 12-volt DC to the power transmitter 75. The line 85 is connected to the digital display 46 which, in accordance with a preferred embodiment, is the "Ditak 6" gallon per minute counter manufactured by the Red Lion Company.

Line 86 is connected to totalizer counters 47 and 48, respectively, with counter 47 indicating the total number of gallons metered by the meter 70 during the test and counter 48 indicating the total number of gallons counted by the meter 70 during the time interval since the counter 48 was last set. Meter 47 has an instant reset button 51 so that it can be reset at any time, whereas the counter 48 has a reset button 52 which must be enabled by key-operated security switch 54 in order to be reset.

Transmitter 81 is connected by line 82 to a connector 102, which similar to connector 83 has line 104 carrying gallon per minute signals and line 106 carrying total gallon signals, similar to the total gallon signals carried by line 86. Lines 103 and 107 carry 12-volt DC to power the transmitter 81. Line 104 is connected to the digital gallon per minute indicator 60. The digital gallon per minute indicator 60 is identical to the digital gallon per minute indicator 46, but generally reads at a slower rate since the volume of water being monitored is substantially less.

Line 106 is connected to gallon totalizers 61 and 62, which are identical to totalizers 47 and 48, with totalizer 61 being resettable at any time with a reset button 66 and totalizer 62 being resettable with a reset button 67 which is enabled by the security switch 54.

Power for operating the test meter 10 is provided by a 12-volt battery 120 which is connected by a cable containing lines 121 and 122 to a "CGB 192" electrical connector 123 that, in turn, has leads 124 and 125 connected to lines 84 and 87, respectively, in order to power the transmitters 81 and 75. The power lines 121 and 122 are connected to the battery 120 through a separable electrical connector 128 so that the battery can be removed from the test meter 10 base for recharging.

Referring again to FIGS. 2-4, in order to facilitate transport of the test meter 10, the test meter is mounted on a base comprising wooden planks 130 and 131, each of which has front and rear handles 133 thereon so that the test meter 10 can be conveniently carried by people. In addition to the handles 133, there are a pair of struts 135 and 136 which have slots 137 and 138 therein for receiving a removable lift bar 139. The lift bar 139 has a hole 140 therethrough which receives a hook so that the test meter can be lifted by a standard hoist if desired.

The test water meter 10 provides a new and improved meter which is portable, relatively inexpensive, and easy to use in that it requires minimal skill to operate and does not require a technician relying on a stopwatch in conducting a test.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A portable test water meter for testing meters used in water lines, the test water meter comprising:
   a single inlet for admitting water which has been metered by a meter under test;
   first and second outlet means connected through the test water meter to the single inlet;
   first valve means disposed between the single inlet and first outlet means for allowing water to flow through the first outlet means when the first valve means is open;
   a first turbine meter means disposed downstream of the inlet means and upstream of the first valve means for measuring flow through the first turbine meter when the first valve means is open;
   first transmitter means connected to said first turbine meter means for converting information indicative of the measurements made by the first turbine meter means to electrical signals and for transmitting those signals;
   first digital display means connected to the first transmitter means for displaying the measurements made by the first turbine meter means;
   a second valve means disposed between the single inlet and the second outlet means in parallel with the first valve means;
   second turbine meter means disposed upstream of the second valve means, the second turbine meter means measuring flow therethrough;
   second transmitting means connected to the second meter means for converting information indicative of the measurements made by the second turbine meter means to electrical signals and for transmitting those signals;
   second digital display means for displaying measurements made by the second turbine meter means to measure flow at a lower rate through the meter under test;
   whereby flow through the test water meter may be compared to readings on the meter under test to determine the accuracy thereof, the test being conducted by closing the second valve while opening the first valve if the meter under test is a relatively large volume meter and being conducted by closing the first valve and opening the second valve if the meter is a relatively small volume meter.

2. The test water meter of claim 1, wherein both the first meter means measure the volume of water flowing therethrough and each includes means for measuring volumes as a function of time to provide a volume-per-minute output and wherein the display means includes a volume-per-minute display and a total volume display.

3. The test water meter of claim 2, wherein each of the total volume displays includes first totalizer display means and means for resetting the first totalizer display means at any time and a second total volume display means which includes means for resetting the second total volume display means which is enabled by a security switch, wherein the second totalizer display means may be reset only by selected personnel.

4. The test water meter of claim 3, further including a low-voltage rechargeable battery and means for detachably connecting the low-voltage rechargeable battery to the first and second digital display means.

5. The test water meter of claim 1, further including a low-voltage rechargeable battery and means for detachably connecting the low-voltage rechargeable battery to the first and second digital display means.

6. The test water meter of claim 1, wherein the first valve means includes an operating stem which, upon rotation thereof, opens and closes the first valve means and wherein the test water meter further includes an indicator plate having indicia thereon generally indicative of flow through the meter under test and a pointer fixed to the valve stem for rotation therewith indicating flow rate as a function of valve position so that the accuracy of the meter under test at various flow rates may be determined.

* * * * *